United States Patent
Ramoutar et al.

(10) Patent No.: US 11,492,051 B2
(45) Date of Patent: Nov. 8, 2022

(54) RESIN PANEL SPACER BLOCK FOR ENERGY ABSORPTION, LOAD SUPPORT, AND GAP PREVENTION

(71) Applicant: TOYOTA MOTOR ENGINEERING & MANUFACTURING NORTH AMERICA, INC., Plano, TX (US)

(72) Inventors: Naipaul D. Ramoutar, Ann Arbor, MI (US); Christopher P. Sheehy, Ypsilanti, MI (US); Valerie Schnabelrauch, Ypsilanti, MI (US); Jonathan R. Young, Saline, MI (US)

(73) Assignee: TOYOTA MOTOR ENGINEERING & MANUFACTURING NORTH AMERICA INC., Plano, TX (US)

( * ) Notice: Subject to any disclaimer, the term of this patent is extended or adjusted under 35 U.S.C. 154(b) by 207 days.

(21) Appl. No.: 16/925,293

(22) Filed: Jul. 9, 2020

(65) Prior Publication Data

US 2022/0009561 A1    Jan. 13, 2022

(51) Int. Cl.
   *B62D 29/04*    (2006.01)
(52) U.S. Cl.
   CPC ................... *B62D 29/043* (2013.01)
(58) Field of Classification Search
   CPC ................. B62D 29/043; B62D 21/15
   See application file for complete search history.

(56) References Cited

U.S. PATENT DOCUMENTS

| | | | |
|---|---|---|---|
| 8,403,399 B2 | 3/2013 | Kuntze | |
| 8,899,658 B1 | 12/2014 | Gangal | |
| 9,162,554 B2 | 10/2015 | Iwano | |
| 9,981,535 B2 | 5/2018 | Ueno | |
| 10,384,520 B2 | 8/2019 | Kuntze | |
| 2012/0248814 A1 | 10/2012 | Tsukiyama | |
| 2014/0167446 A1 | 6/2014 | Iwano | |
| 2014/0203577 A1* | 7/2014 | Nagwanshi | B60R 19/023 293/120 |
| 2016/0167494 A1 | 6/2016 | Ayukawa | |
| 2016/0214655 A1 | 7/2016 | Demange | |
| 2016/0347155 A1 | 12/2016 | Kuntze | |
| 2016/0375747 A1 | 12/2016 | Kawashima | |
| 2017/0066306 A1 | 3/2017 | Ueno | |
| 2017/0174057 A1 | 6/2017 | Miyake | |
| 2018/0056763 A1 | 3/2018 | Motohashi | |
| 2018/0154746 A1 | 6/2018 | Lee | |
| 2019/0217690 A1 | 7/2019 | Chiba | |

FOREIGN PATENT DOCUMENTS

WO    2019006271    1/2019

* cited by examiner

*Primary Examiner* — D Glenn Dayoan
*Assistant Examiner* — Melissa Ann Bonifazi
(74) *Attorney, Agent, or Firm* — Sheppard, Mullin, Richter & Hampton LLP; Hector A. Agdeppa; Daniel N. Yannuzzi

(57) ABSTRACT

A spacer for vehicle panels can be shaped such that it absorbs a substantial portion of a first load, the first load applied in a first direction substantially perpendicular to the exterior panel; controllably deforms along a second direction when a second load is applied substantially along the second direction; wherein the second direction is other than the first direction. The spacer need not deform along the second direction when the first load is applied. The spacer can have a shaped member having a channel extending through the spacer perpendicular from the exterior panel, such that the spacer can controllably deform along a width of the channel.

19 Claims, 4 Drawing Sheets

RESIN PANEL SPACER BLOCK FOR ENERGY ABSORPTION, LOAD SUPPORT, AND GAP PREVENTION

TECHNICAL FIELD

The present disclosure relates generally to panel spacers composite panel systems structurally reinforced with panel spacers.

DESCRIPTION OF RELATED ART

Composite panels, such as resin composite exterior panels are common in vehicles. For example, resin composite is lightweight and allows for styling flexibility for design of a variety of vehicle body shapes. However, during collisions, resin panels may fracture and break away leaving gaping holes along panel seams, weak areas, or break points in vehicle panels such that lightweight panels may not provide adequate protection of the passenger compartment from objects entering or leaving the cabin (i.e. when the vehicle panel is a door) during a collision.

BRIEF SUMMARY OF THE DISCLOSURE

Embodiments may provide improved resin composite panels. The present disclosure provides systems and methods for improved resin panels with an easy to manufacture and/or assemble spacer block for energy absorption, load support, and gap prevention. Embodiments of the present disclosure provide both strength and durability, but also deformability and flexibility, to a lightweight, yet brittle vehicle exterior panel.

Embodiments may provide a spacer for vehicle paneling.

Spacer can include a top portion. Top portion can include an exterior panel coupling surface. Exterior panel coupling surface can be configured to couple to an exterior panel of a vehicle.

In embodiments, spacer can include a shaped member extending from top portion to a bottom portion. Shaped member can include one or more channel extending through the spacer. The channel can extend from the exterior panel coupling surface.

In embodiments, the shaped member can at least partially circumscribe a vertical aperture extending through the shaped member. The shaped member can at least partially circumscribe a vertical aperture extending from exterior panel coupling surface to bottom portion.

In embodiments, the shaped member can be configured to absorb a substantial portion of a first load applied in a first direction. The first direction can be perpendicular to the coupling surface (or substantially perpendicular to the coupling surface).

The channel can be configured to allow a controlled deformation. The channel can allow for a controlled deformation (e.g. of the spacer and/or the spaced member). The channel can allow for a controlled deformation when the first or a second load (or a component thereof) is applied substantially along a direction along a width of the channel.

In embodiments, the channel can have a vertex closer to a geometric center of the spacer than a geometric exterior of the spacer.

In embodiments, the channel can extend through the entire shaped member.

In embodiments, the spacer can further include a tether coupled to the shaped member on a first side of the channel.

In embodiments, the tether can be coupled to another point of the shaped member of a side of the channel other than the first side.

In embodiments, shaped member can expand upon an impact. Tether can be configured to delay an expansion of the spacer block upon an impact.

In embodiments, the spacer for vehicle paneling can be made of durable resin. The spacer can have a higher tensile strength in the first direction than the direction along the width of the channel.

In embodiments, the spacer for vehicle paneling can be configured for insertion in a body of a vehicle. In embodiments, the spacer for vehicle paneling can be configured for insertion between an exterior panel, such as an exterior body panel, and a geometric center of the vehicle.

A composite panel system can include spacer for vehicle paneling as described herein.

In embodiments of composite panel systems, the composite panel system can include an exterior panel. The composite panel system can further include a first spacer. The first spacer can be proximal to the exterior panel.

In embodiments, the first spacer can be shaped and/or otherwise configured as spacer described herein. The first spacer can be configured to absorb at least a portion of a first load. First load (or component thereof) can be applied in a first direction substantially perpendicular (or perpendicular) to the exterior panel.

In embodiments, first spacer can be configured to controllably deform along a second direction when a second load is applied substantially along the second direction. The second direction can be other than the first direction. In embodiments, the first spacer does not deform along the second direction when the first load is applied.

In embodiments, the first spacer can include a shaped member. The shaped member can include one or more channels. One or more channels can extend substantially perpendicular to the exterior panel. One or more channels can extend from the exterior panel. One or more channels can extend at least partially though the first spacer.

In embodiments, the one or more channel can be configured to allow a controlled deformation when the first load is applied substantially along the second direction. In embodiments, the one or more channel can be configured to allow a controlled deformation when the second load is applied substantially along the second direction.

Embodiments of composite panel systems can include a second spacer. The second spacer can be positioned on the same side of exterior panel as the first spacer.

The second spacer can further include a second spacer shaped member. Second spacer shaped member can include one or more channels. The one or more channels of the second spacer shaped member can extend from the exterior panel. The one or more channels of the second spacer shaped member can extend at least partially though to the second spacer.

In embodiments, first spacer and second spacer can be arranged in a honeycomb pattern. In embodiments, first spacer and second spacer can be arranged such that first spacer shaped member and second spacer shaped member couple at an angle. In embodiments, the angle is 120 degrees.

In embodiments of composite panel system, the composite panel system can include a tether coupled to the shaped member (i.e. the first shaped member or the second shaped member). Tether can be coupled to one other point of that spacer.

In embodiments, shaped member (i.e. the first shaped member or the second shaped member) can be configured to expand upon an impact. Tether can be configured to delay an expansion of the spacer block upon an impact.

Composite panel systems can further include an inner panel. Inner panel can be on the other side of the first spacer (and/or second spacer) than the exterior panel. In embodiments, the first spacer (and/or the second spacer) is fastened to the inner panel. In embodiments, first spacer (and/or second spacer) is fastened to the exterior panel.

In embodiments, first spacer (and/or second spacer) is fastened to the exterior panel such that in the event of a fracture at the exterior panel, the exterior panel remains seamed together. In embodiments, first spacer (and/or second spacer) is fastened to the interior panel such that in the event of a fracture at the exterior panel, the exterior panel remains seamed together.

In embodiments, shaped member (i.e. first shaped member and/or second shaped member) can include a living hinge. The living hinge may allow for the shaped member to controllably deform along the second direction.

In embodiments, first spacer (and/or second spacer) can be made of durable resin. Durable resin can have a higher tensile strength in the first direction than in the second direction. First spacer (and/or second spacer) can have a higher tensile strength in the first direction than in the second direction.

In embodiments, composite panel system can be configured for insertion in a vehicle. In embodiments, the exterior panel can be configured as a portion of a body of the vehicle. In embodiments the composite panel system can be configured for insertion in vehicle such that the exterior panel can be a portion of a body of the vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the present technology provide one or more spacer blocks positioned behind and coupled to the inner surface of exterior panels. As described herein, exterior panels can form external surfaces of components of a body of vehicles, such as passenger doors, quarter panels, bumpers, luggage compartment doors, wheel wells, and/or engine hoods of a vehicle. As described herein, vehicles can be flying, submersible, boats, roadway, off-road, passenger, truck, trolley, train, aerospace, or other vehicles. These exterior panels may be likely to sustain impact forces and lateral damage in the event of a collision. The present disclosure provides a variety of design features such that the loads acting on the panel are transferred directly to the spacer block. The face of the spacer block may provide low compression and high durability. The walls of the spacer block can be designed with a variety of intricate features.

Figure 1A:
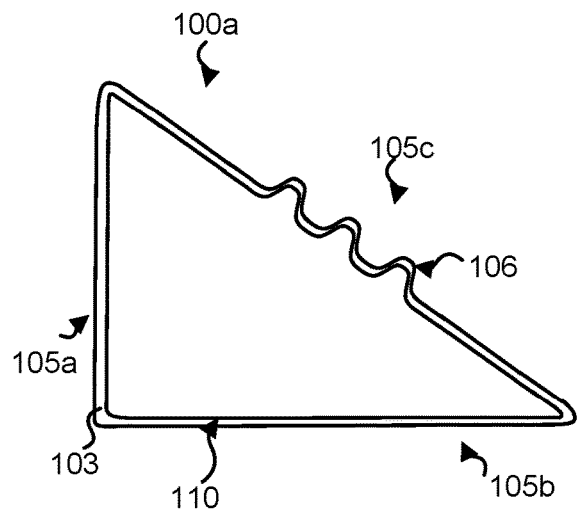
FIG. 1A shows a top plan view of spacer block having controlled deformation support channels according to aspects of the present disclosure.

FIG. 1A shows a first embodiment of a spacer block 100 in top plan view. Spacer block 100 may be made of a metal such as aluminum. Spacer block 100 may be made of a durable resin. Spacer block 100 may have a higher tensile strength along one plane or axis (e.g. a plane or axis into the page in top plan view of FIG. 1A) while providing flexibility and ductility along another plane or axis (e.g. along the plane of the paper or parallel thereto in the top plan view of FIG. 1A). The spacer block 100 may have a higher stiffness, or modulus of elasticity in a first direction, than in a second direction.

Spacer block 100 can have a top surface 103. Top surface 103 can be configured to adhere to and/or conform to an exterior panel (not shown). The bottom surface (not shown) can be configured to adhere to an interior panel or other structural component of the vehicle.

The spacer block 100 can have at least one lateral side 105. The lateral sides 105 can meet to form a substantially polygonal shape. The lateral sides 105 can be substantially straight (e.g. see sides 105a, 105b), but can also have curved features, depressions and/or overhangs. The lateral sides 105 can be substantially uniform in thickness, or be non uniform. The spacer block 100 can be prismatic in shape (e.g. triangular prism, rectangular prism, hexagonal prism, etc.). The prismatic shape may be right, oblique, and/or truncated (e.g. non-parallel top 103 and bottom surfaces).

Lateral sides 105 can provide a rigid support along a plane perpendicular to the top surface 103 to provide rigid support against loads applied to panel(s) adjacent to the top surface 103. The spacer block 100 can have high strength, stiffness, and/or elastic modulus, along that plane perpendicular to the top surface 103. The spacer block 100 may be configured to absorb a substantial portion of a first load applied in first direction substantially perpendicular to the exterior panel coupled to the spacer block 100. The spacer block 100 may not substantially deform in any direction when that load is applied.

The lateral sides can also include various design features, for example, bending seams, channels, expansion points, and crush zones where predictable results from impact forces are mitigated. These impact forces may be along planes other than the plane perpendicular to the top surface 103.

At least one shaped member of the spacer block 100, such as a corrugated lateral side 105c, can include bending seams, flutes, expansion points, crush zones, and/or corrugated bends. In embodiments there is at least one corrugated channel, including even or odd number of channels in the corrugated lateral side 105c. Channel(s) in one or more of the lateral sides (e.g. corrugated lateral side 105c) can allow for a controlled deformation when a load is applied substantially along a direction along a width of the channel. Such controlled deformation support channels(s) however, can allow for rigidity and/or support when a load is applied along a length of the channel. Channels as described herein, can be formed by rolling and/or stamping.

Each channel can have one or more vertex 106 which is off center from a center line of the lateral side 105c. The vertex 106 can be the same, or differently shaped for each channel in the corrugated lateral side 105c. In embodiments, the channel can have 1 mm to 50 cm base size (e.g. a channel width). In embodiments, the channels can have 1 mm to 100 cm of spacing between channels. In embodiments, the channels, when the spacer is viewed in top plan, can have bends which are "S" shaped. In embodiments, the vertex 106 is substantially plateau shaped, substantially angular, bell shaped, and/or substantially curved. The vertex 106 can be internal facing (towards a geometric center of the spacer block, such that the concave portion of the channel is external facing), or external facing. The vertices 106 can all be facing the same direction, or be facing different directions. External facing bends when viewed in can be more than internal facing bends. The corrugated bends can be facing internal or external to the spacer block 100. For example, in the figure, the bends are facing external to a geometric center of the spacer block 100. In some embodiments, the bends can form a wave and/or sinusoidal pattern with a first portion above a centerline of the lateral side, and a second portion below the same centerline of the lateral side. The first portion can be substantially equal to the second portion.

Figure 1B:
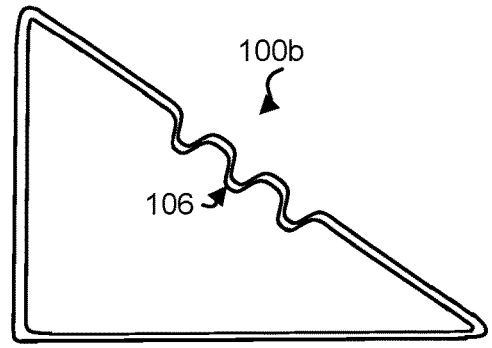
FIG. 1B shows a top plan view of another spacer block having channels according to aspects of the present disclosure.

FIG. 1B shows another embodiment of a spacer block 100b, having internal facing vertices 106 in the corrugated portion of a corrugated lateral side 105d. As shown, the corrugated bends can be facing internal to the spacer block. Controlling the direction of the vertices, and/or the combination of the directions used, may allow for controlled deformation of the spacer block 100.

Figure 1C:
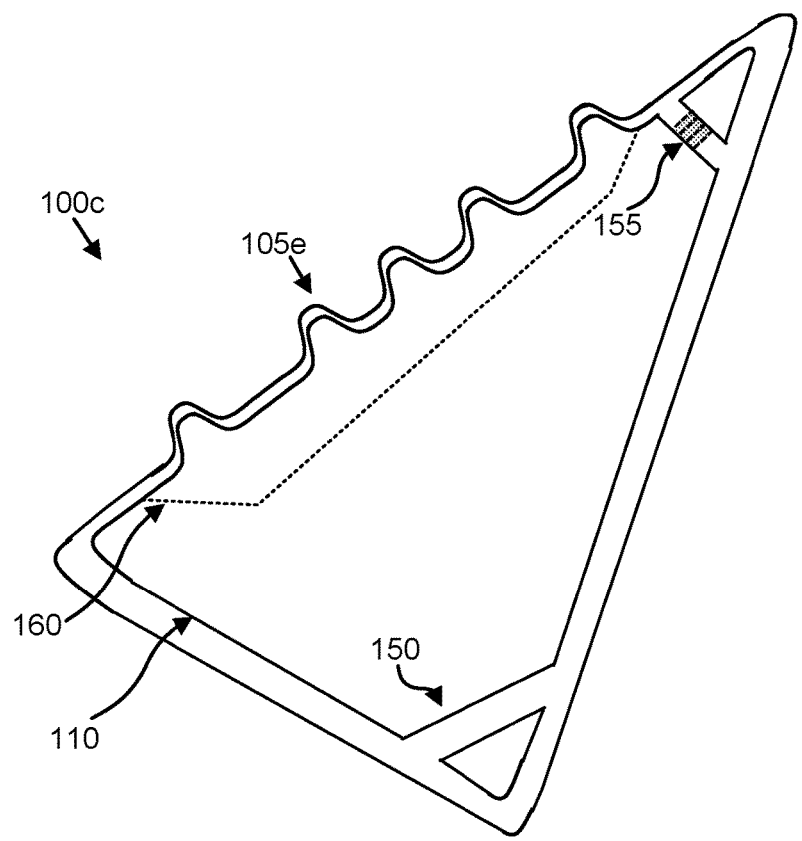
FIG. 1C shows a top plan view of yet another spacer block having channels according to aspects of the present disclosure.

FIG. 1C shows a top plan view of another embodiment of a spacer block 100c. The spacer block 100c can have a generally triangular prism shape, with three lateral sides together defining one or more vertical aperture 110. Vertical aperture 110 may be filling in with lightweight material, such as insulation, and/or other vehicle components. At least one of the lateral sides 105e can have a corrugated portion with one or more bends. Spacing between the bends of the corrugated portion of the lateral side 105e can be uniform or non-uniform.

The spacer block 100 can have one or more cross beams 150 for further support, (the spacer block 100 can thus have more than one vertical aperture 110). The cross beam 150 can span from one of the lateral sides to another. The cross beams 150 can be coplanar with the top surface 103. Alternatively, the cross beam 150 can be only a portion of a thickness of spacer block 100. The one or more cross beams 150 may be rigid and/or made from the same or different material than the rest of the spacer block 100. One or more cross beam 155 can have a corrugated pattern, and or contain a living hinge or break seam. The cross beam 150,155 may be used to prevent buckling of at least one of the lateral sides 105, and/or add flexibility, rigidity and/or stiffness in a specific direction. The cross beam 150 may have a cross hatched, honeycomb, or other pattern.

Other designed features may include living hinges and/or break seams designed to provide adequate coverage and structural support, especially in the event of a panel fracture. The living hinge and/or the break seam may allow for a controlled deformation. For example, the living hinge and/or break seam may be rigid if an impact force is of a specific magnitude and/or direction is applied, and controllably deform (e.g. the living hinge collapsing) if the impact force has a higher magnitude, and/or different direction. The living hinges and/or break seams can be positioned at one or more of the lateral sides, and/or at a cross beam 150.

Other design features may include one or more tether 160 that may delay an expansion and/or compression of the spacer block 100 (or portion thereof) until an impact threshold is exceeded. The tether 160 can be configured to delay an expansion of the spacer block upon an impact. The tether 160 may be coupled between two points of the spacer block 100, such as between two lateral sides 105. The tether can be between two points of the corrugated lateral side 105, between the inner panel the exterior panel, between a point of the spacer block and at least one point of the inner panel, and/or between a point of the spacer block 100 and at least one point of the exterior panel. The tether 160 may have two or more attachment points. Tether(s) 160 may be braided stainless steel cable, stainless steel tubing, composite, plastic, rope, bungee, or wide webbing material. Tethers may be configured to snap or break at a specific impact threshold. One or more tethers may be used. Tethers may be configured as expansion and/or compression springs, and/or bungee.

Further, metal, fiber, and/or resin crash zones, and/or crumple zones may be designed in an expanded foam, honeycomb, and/or an accordion configuration in areas where energy absorption may be more desirable (e.g., front or rear bumpers). For example, an outer surface of the spacer block may be supplemented with a crumple zone.

As shown in FIG. 1A-1C, a spacer block 100 can include lateral sides 105 in a corrugated configuration (e.g. with depressed or recessed channels) to prevent any lateral forces acting on an exterior panel from cracking and opening a large gap in the exterior panel, which would normally occur in the absence of the spacer block (for example, if the exterior panel were made of resin). For instance, the spacer block 100 can absorb the impact forces acting directly on the top surface 103 of the block (e.g., a top flat surface of the spacer block) while any side load that would normally crack and stretch the exterior panel (e.g. if it were made of resin) to form a gap would be prevented. Side loads that would otherwise cause cracks of gaps in the exterior panel would be prevented through designed response of the lateral sides of the spacer block 100 (e.g. elastic response). The lateral sides can stretch and straighten along the corrugated section to provide an extended coverage area (i.e. the coverage area between the exterior panel and the spacer block). This also has the effect of dampening the impact as the side wall stretches (e.g. creating resistance similar to a bungee cord). In other words, the spacer block can act as a shield along one axis while also acting as a net along another axis. The unique support to exterior panels provided by the improved spacers described herein can provide both strength and flexibility to a brittle but lightweight exterior vehicle panel.

The lateral sides of the spacer block 100 can define one or more vertical aperture(s) 110. The one or more vertical aperture 110 may go through at least a portion of the spacer block 100 from the top surface 103 and at least partially through the spacer block 100. Lateral sides of the spacer block can absorb a substantial portion of a first load applied in a first direction perpendicular to the top surface 103.

In one example embodiment, a top surface 103 may be coupled to an exterior panel shaped as a side of a vehicle. If there is an impact at the door, a load may transfer through the spacer block 100 such that the impact force acting on the door is absorbed by the spacer block 100. If there is an impact at a side quarter panel adjacent to the door exterior panel, this may otherwise create cracks and/or gaps at the exterior panel. The design of the spacer block 100 may provide flexibility and/or ductility to mitigate such cracks, gaps, and/or other damage to the exterior panel.

The shape and target deformation (controlled deformation) may vary depending on the design of the exterior panel and the materials used. For instance, aluminum, steel or other metal materials (or non-metallic materials) may be used as a spacer block 100 in areas where extensive coverage and travel is desired. However, a lightweight resin block may also be used where weight is a concern. Spacer blocks as described herein can be formed of metal, composites, and/or plastics. For example, the spacer block can be anodized aluminum.

Figure 2A:
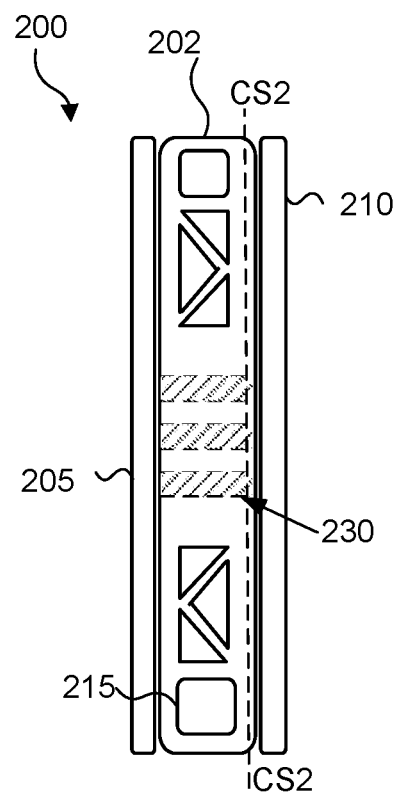
FIG. 2A shows a side view of a composite panel system including a spacer block according to aspects of the present the disclosure.

FIG. 2A shows a side view of a composite panel system 200 including a spacer block 202, internal panel 205, and/or external panel 210. Spacer block 202 can be either of the configurations described herein, e.g. spacer block 100 of FIGS. 1A-C. For example, spacer block 100 of FIG. 1A can be a top plan view taken across a cross section CS2 of spacer block 202. The spacer block 202 can be between the internal panel 205 and the external panel 210. In other embodiments, spacer block 202 is positioned between internal components of a vehicle, such as structural components, and the external panel 210. Spacer block 202 can be coupled (e.g. by tieing, fastening, welding, gluing, or otherwise attaching) to the internal panel 205 and/or external panel 210. Spacer block 202 can have adhesive and/or fastener(s) at least partially between the spacer and the interior panel and/or between the spacer 202 and the external panel 210. The adhesive and/or fastener can be configured to couple the spacer block 202 to the panels 205, 210. Because the spacer block 202 is fastened to the external panels 210 in select areas, and because of the configuration of the vertical sides of the spacer 202 (e.g. the corrugated portion) the strength and elasticity provided by the spacer 202 would act as an adhesive to seam the external panel 210 together even in the event a fracture does occur. This is especially apparent in brittle, composite external panel 210, e.g. with a resin external panel 210.

One or more horizontal aperture(s) 215 can go at least partially through the entire spacer block 202. The one or more horizontal aperture(s) go at least partially through the lateral sides (105) of the spacer block 202. The horizontal aperture(s) 215 can allow for spacer block with reduced weight, yet controlled rigidity and/or flexibility.

The spacer block 202 can have one or more channels 230 going at least partially, from the external panel 210 to the interior panel 205. The channels 230 in the one or more channels 230 can be equidistant from their adjacent channel(s) 230, and/or have different distances between channels 230. The channels 230 in the one or more channels 230 can have the same or different widths. Each channel in the one or more channels 230 can have a channel width that is constant across a length of that channel, or that varies along the length of the channel. The channels 230 can be extended from the external panel 210 and/or interior panel 205. The channels 230 can be as previously described with reference to corrugated vertical side(s) 105c, 105d, 105e of FIG. 1A-1C, (i.e. having bent shape in top plan view of the spacer block 202, where the vertex (e.g. vertex 106) is a midline of one of the channels 230). The channel can extend through the spacer block 202 perpendicular from the external panel 210, such that the spacer block 202 can controllably deform along a width of the channel(s) 230.

One or more spacer blocks as described herein may work collectively to further enhance the strength or absorption qualities by a factor of n. The spacer block may include one or more component spacer blocks, two or more component spacer blocks, three or more component spacer blocks, etc. Component spacer blocks of the spacer block may be the same (e.g. same size, shape, material, configuration, and/or other features), or they can be different. Component spacer blocks may be spacer blocks as described herein. Adding more than one spacer block in series and/or in parallel (i.e. from an internal panel 205 to an external panel 210) may further customize and tune the amount of support, resistance, flexibility, strength, and/or coverage desired across a wide range of applications. The multiple component spacers can meet with at least one gap, and/or with one or more material between them (such as adhesive, insulation, and/or resin).

Figure 2B:
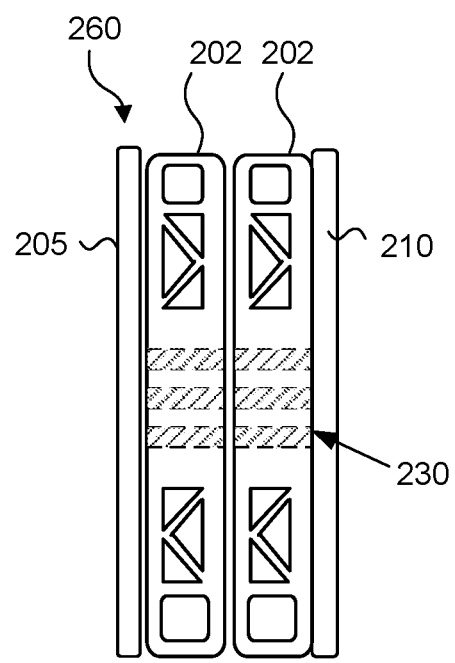
FIG. 2B shows a side view of a composite panel system including two parallel spacer blocks according to aspects of the present disclosure.

FIG. 2B. shows a side view of a series composite panel system 260 having two component spacer blocks 202 positioned consecutively between the internal panel 205 and an external panel 210. Two or more component spacer blocks 202 may be stacked to provide twice the compression power in areas of high impact (e.g., side vehicle impact zones) or anticipated large loads (e.g., truck bed or roof luggage racks). The component spacer blocks 202 may be selectively fastened, glued, welded, or attached to each other, or otherwise coupled to each other. The component spacer blocks 202 may be the same, or different, e.g. with different horizontal apertures, vertical apertures, and/or other features as described herein.

Figure 3:
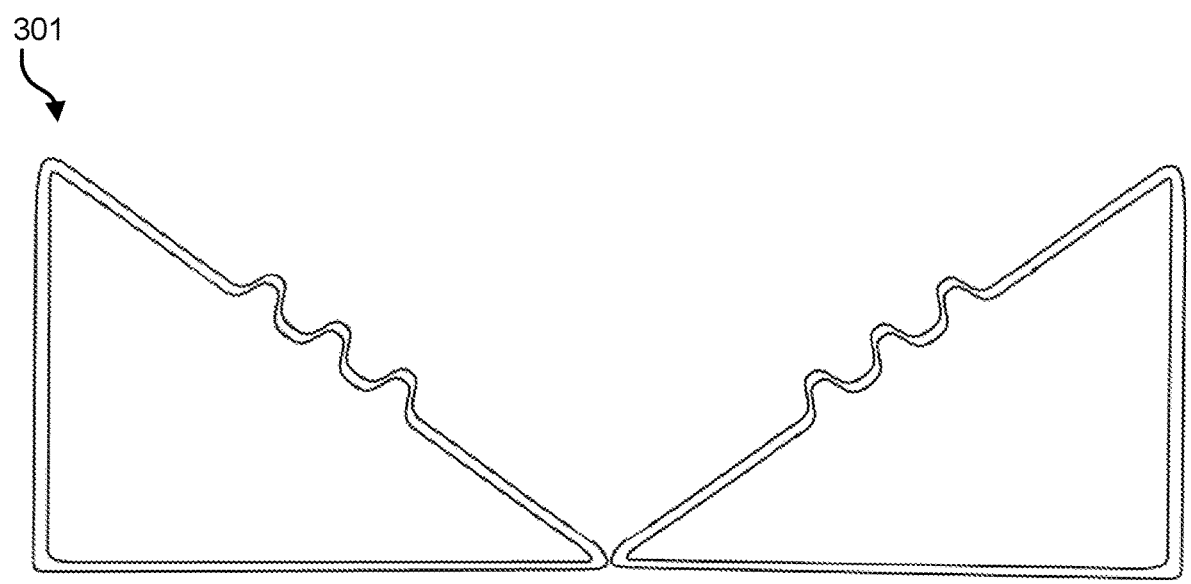
FIG. 3 shows a top plan view of a honeycomb spacer block pattern of two component spacer blocks, according to aspects of the present disclosure.

FIG. 3A shows multiple coplanar component spacer blocks 300a, 300b forming a spacer block 301. Coplanar component spacer blocks 300a, 300b can be part of a parallel vehicle panel system, such as for composite panels. The component spacer blocks 300a 300b, may be coplanar or substantially coplanar (i.e. there may be some overlap between the spacers). The multiple component spacer blocks 300a, 300b may be coplanar on the same side of the exterior panel. The figure shows two coplanar spacers, although more than two may be configured. The component blocks may be configured so that the corrugated lateral sides 105 of the different spacer blocks 300 intersect at an angle 310. The angle can be 0 to 180 degrees. In other embodiments, the component spacers are not coplanar, and the angle between them may define a skew between the component spacer blocks. One or more component spacer blocks may work collectively to further enhance the strength or absorption qualities by a factor of n. For example, two or more component spacer blocks may have angles between corrugated portions which are (at least partially) in a honeycomb pattern. Two or more component spacer blocks may be positioned adjacent one another to double the load absorption (e.g., for side vehicle impact zones.) As used herein, a honeycomb pattern can be the two or more spacer blocks forming at least two adjacent sides of a hexagonal shape (e.g. with 120 degrees). The sides of that honeycomb pattern can be formed by the corrugated lateral sides and/or non-corrugated lateral sides.

Because the (component) spacer blocks can be fastened to the exterior panel in select areas, and because of the configuration of the vertical sides of the component spacer blocks (e.g. the corrugated portion), the strength and elasticity provided by the component spacer block(s) acts as an adhesive to seam the external panel together even in the event a fracture does occur. For example, the portion of the external panel coupled to a first component spacer block, can otherwise stay connected, or seamed with the portion of the exterior panel which is directly coupled to a second component spacer block (the second component spacer block other than the first component spacer block).

Figure 4A:
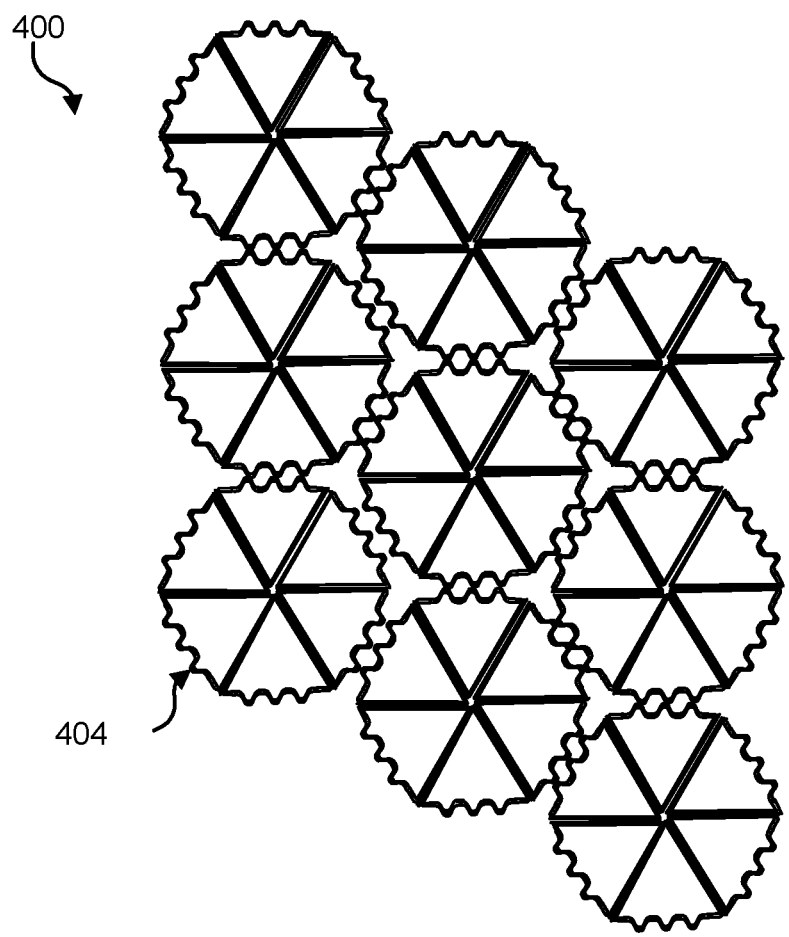
FIG. 4A shows a top plan view of another honeycomb spacer block pattern according to aspects of the present disclosure.

FIG. 4A shows a top plan view honeycomb pattern 400 for component spacer blocks. Component spacer blocks can be of the same configuration. The component spacer blocks may be coplanar, and the corrugated portions of the component spacer blocks may form cells 404 of the honeycomb pattern. It can be understood that the honeycomb pattern 400 can be applied on side of an exterior panel as described herein, for benefits as described herein such as providing improved strength in a direction perpendicular to a surface of the exterior panel, and improved flexibility, ductility along another axis.

Figure 4B:
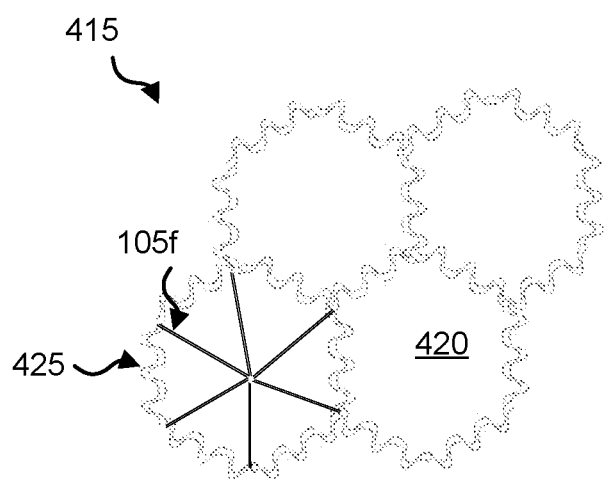
FIG. 4B shows a top plan view of yet another honeycomb spacer block pattern, according to aspects of the present disclosure.

FIG. 4B shows another top plan view of another honeycomb pattern 415 of component spacer blocks. In some honeycomb configurations, sub-component spacer blocks having corrugated lateral sides can form a larger component spacer block in the form of a honeycomb cell (e.g. substantially hexagonal in shape). For example, in FIG. 4B, a component spacer block can include multiple lateral sides with each lateral side having a corrugated configuration of a first type 420. These multiple lateral sides, each having a corrugated configuration, can form a hexagonal (or other shaped) shell. This can prevent any lateral forces acting on an exterior panel from cracking and opening a large gap in the exterior panel, which would normally occur in the absence of the spacer block (for example, if the exterior panel were made of resin). Further, a second type 425 of honeycomb cells can be formed with the component spacer blocks having at least one, substantially straight lateral side 405f. Honeycomb cells can have portions which belong to one or more component spacer blocks, and portions of component spacer blocks can belong to one or more honeycomb cells. In other configurations, sides of each cell of the honeycomb pattern are non-corrugated, while other sides are corrugated. In some configurations, sides of cells of the honeycomb pattern facing a first direction are corrugated, while sides of cells of the honeycomb pattern along a different direction (other than the first direction) are non-corrugated. Although a first type 420 and a second type of honeycomb cells are shows here, honeycomb configurations having a single type, or any combination of either of the types 420, 425, may be configured. Further, other types of honeycomb patterns may be configured, including 3d honeycomb patterns using non-coplanar component spacer blocks.

Spacer block reinforced resin panels described herein may thus offer different levels of flexibility, ductility, and/or rigidity along different axes. Spacer blocks as described herein may be formed by additive and/or subtractive manufacturing processes, and conventional joining and metallurgic methods. Spacer blocks as described herein can be tested for and designed for specific parameters (e.g. rigidity, elasticity, ductility, frangibility) at or for specific criteria (such as impact forces, impact directions, temperatures), and fall within the scope of the present disclosure.

Spacer block(s) of the present disclosure can facilitate design of versatile composite panel systems with ease of manufacturability by combining parallel and/or series spacer blocks. Knowledge of specific parameters of single spacer blocks (e.g. stiffness, flexibility, elasticity, strength) across different dimensions, may allow for meeting design requirements of vehicle systems (e.g. crash loads), while preventing damage deformations of exterior vehicle panels.

The term "coupled" refers to direct or indirect joining, connecting, fastening, contacting or linking, and may refer to various forms of coupling such as physical, mechanical, chemical, magnetic, electromagnetic, or other coupling, or a combination of the foregoing. Where one form of coupling is specified, this does not imply that other forms of coupling are excluded.

Although illustrated and described above with reference to certain specific embodiments and examples, embodiments of the present disclosure are nevertheless not intended to be limited to the details shown. Rather, various modifications may be made in the details within the scope and range of equivalents of the claims and without departing from the spirit of the present disclosure. It is expressly intended, for example, that all ranges broadly recited in this document include within their scope all narrower ranges which fall within the broader ranges. In addition, features of one embodiment may be incorporated into another embodiment. Further, single continuous components shown, can be comprised of multiple subcomponents.

What is claimed is:

1. A spacer for vehicle paneling, comprising:
   a top portion comprising an exterior panel coupling surface, the exterior panel coupling surface configured to couple to an exterior panel of a vehicle;
   a shaped member extending from the top portion to a bottom portion, the shaped member comprising a channel extending through the spacer from the exterior panel coupling surface;
   wherein the shaped member at least partially circumscribes a vertical aperture extending through the shaped member from the exterior panel coupling surface to the bottom portion; and
   a tether coupled to the shaped member on a first side of the channel, and at another point of the shaped member of a side of the channel other than the first side.

2. The spacer for vehicle paneling of claim 1, wherein the shaped member is configured to absorb a substantial portion of a first load applied in a first direction perpendicular to the coupling surface; and wherein the channel is configured to allow a controlled deformation when the first or a second load is applied substantially along a direction along a width of the channel.

3. The spacer for vehicle paneling of claim 2, wherein the spacer is made of durable resin having a higher tensile strength in the first direction than the direction along the width of the channel.

4. The spacer for vehicle paneling of claim 1, wherein the spacer for vehicle paneling is configured for insertion in a body of a vehicle.

5. A spacer for vehicle paneling, comprising:
   a top portion comprising an exterior panel coupling surface, the exterior panel coupling surface configured to couple to an exterior panel of a vehicle;
   a shaped member extending from the top portion to a bottom portion, the shaped member comprising a channel extending through the spacer from the exterior panel coupling surface, wherein the channel has a vertex closer to a geometric center of the spacer than a geometric exterior of the spacer; and
   wherein the shaped member at least partially circumscribes a vertical aperture extending through the shaped member from the exterior panel coupling surface to the bottom portion.

6. The spacer for vehicle paneling of claim 1 or 5, wherein the channel extends through the entire shaped member.

7. A composite panel system, comprising:
an exterior panel;
a first spacer positioned proximal to the exterior panel, and shaped such that the first spacer is configured to:
absorb a portion of a first load, the first load applied in a first direction substantially perpendicular to the exterior panel;
controllably deform along a second direction when a second load is applied substantially along the second direction;
wherein the second direction is other than the first direction, and the first spacer does not deform along the second direction when the first load is applied.

8. The composite panel system of claim 7, wherein the first spacer comprises:
a shaped member comprising one or more channels, the one or more channels extending substantially perpendicular to the exterior panel, from the exterior panel and at least partially though the first spacer.

9. The composite panel system of claim 8, wherein the one or more channel is configured to allow a controlled deformation when the first load is applied substantially along the second direction.

10. The composite panel system of claim 8, further comprising:
a second spacer positioned on the same side of the exterior panel as the first spacer; wherein the second spacer further comprises:
a second spacer shaped member, the second spacer shaped member further comprising one or more channels, the one or more channels extending from the exterior panel at least partially though to the second spacer.

11. The composite panel system of claim 10, wherein the first spacer and the second spacer are arranged in a honeycomb pattern such that the first spacer shaped member and the second spacer shaped member couple at an angle.

12. The composite panel system of claim 11, wherein the angle is 120 degrees.

13. The composite panel system of claim 8, the composite panel further comprising:
a tether coupled to the shaped member and one other point of the first spacer.

14. The composite panel system of claim 8, wherein the shaped member is configured to expand upon an impact.

15. The composite panel system of claim 7, further comprising:
an inner panel on the other side of the first spacer than the exterior panel, wherein the first spacer is fastened to the inner panel and to the exterior panel.

16. The composite panel system of claim 7, wherein the first spacer is fastened to the exterior panel such that in the event of a fracture at the exterior panel, the exterior panel remains seamed together.

17. The composite panel system of claim 7, further comprising:
a shaped member comprising a living hinge, the shaped member configured to controllably deform along the second direction by the living hinge.

18. The composite panel system of claim 7, wherein the first spacer is made of durable resin having a higher tensile strength in the first direction than in the second direction.

19. The composite panel system of claim 7, wherein the composite panel system is configured for insertion in a vehicle, such that the exterior panel is configured as a portion of a body of the vehicle.

* * * * *